United States Patent
Tanaka et al.

(10) Patent No.: US 10,291,859 B2
(45) Date of Patent: May 14, 2019

(54) IMAGING DEVICE AND IMAGING METHOD FOR COMPOSING A NON-VISIBLE LIGHT IMAGE AND A VISIBILE LIGHT IMAGE

(71) Applicant: PANASONIC INTELLECTUAL PROPERTY MANAGEMENT CO., LTD., Osaka (JP)

(72) Inventors: Shogo Tanaka, Kanagawa (JP); Kenji Tabei, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 15/518,806

(22) PCT Filed: Nov. 5, 2015

(86) PCT No.: PCT/JP2015/005549
§ 371 (c)(1),
(2) Date: Apr. 13, 2017

(87) PCT Pub. No.: WO2016/075908
PCT Pub. Date: May 19, 2016

(65) Prior Publication Data
US 2017/0237887 A1 Aug. 17, 2017

(30) Foreign Application Priority Data
Nov. 13, 2014 (JP) .................................. 2014-230975

(51) Int. Cl.
*H04N 5/33* (2006.01)
*H04N 5/235* (2006.01)
(Continued)

(52) U.S. Cl.
CPC ........... *H04N 5/2352* (2013.01); *G03B 7/091* (2013.01); *G03B 15/05* (2013.01); *H04N 5/217* (2013.01);
(Continued)

(58) Field of Classification Search
CPC .... H04N 5/2352; H04N 5/217; H04N 5/2258; H04N 5/332; H04N 5/44504;
(Continued)

(56) References Cited

U.S. PATENT DOCUMENTS

| 7,840,360 | B1* | 11/2010 | Micheels | G01J 3/42 |
| | | | | 250/223 B |
| 2003/0047683 | A1* | 3/2003 | Kaushal | G02B 23/12 |
| | | | | 250/330 |

(Continued)

FOREIGN PATENT DOCUMENTS

| JP | 58-046929 A | 3/1983 |
| JP | 2012-048069 A | 3/2012 |

(Continued)

OTHER PUBLICATIONS

Zeng et al, Long-wavelength IR imaging system to scuba diver detection in three dimensional (Year: 2010).*

(Continued)

*Primary Examiner* — Shan E Elahi
(74) *Attorney, Agent, or Firm* — Greenblum & Bernstein, P.L.C.

(57) ABSTRACT

An imaging device includes an imaging section including an imaging sensor section of a rolling shutter system, a condition designator that sets an imaging condition using first auxiliary light which is non-visible light as an imaging condition for the imaging section and an imaging condition using visible light with the first auxiliary light as non-emitted light, and alternately designates the imaging condi- (Continued)

tion and a light emission condition of the first auxiliary light at a cycle of at least two frames in a time division basis, a first light emitter that emits the first auxiliary light according to the light emission condition; and an image composer that composes a non-visible light image captured by the imaging section under the imaging condition using the first auxiliary light during a first period in which the first auxiliary light is emitted and a visible light image captured by the imaging section under the imaging condition using the visible light during a second period subsequent to the first period.

10 Claims, 14 Drawing Sheets

(51) Int. Cl.

| | |
|---|---|
| *G03B 7/091* | (2006.01) |
| *G03B 15/05* | (2006.01) |
| *H04N 5/217* | (2011.01) |
| *H04N 5/225* | (2006.01) |
| *H04N 5/445* | (2011.01) |
| *H04N 9/097* | (2006.01) |
| *H04N 9/73* | (2006.01) |

(52) U.S. Cl.
CPC ......... *H04N 5/2256* (2013.01); *H04N 5/2258* (2013.01); *H04N 5/235* (2013.01); *H04N 5/332* (2013.01); *H04N 5/44504* (2013.01); *H04N 9/097* (2013.01); *H04N 9/735* (2013.01)

(58) Field of Classification Search
CPC ...... H04N 5/2256; H04N 5/235; H04N 9/735; H04N 9/097; G03B 15/05; G03B 7/091
USPC .......................................................... 348/164
See application file for complete search history.

(56) References Cited

U.S. PATENT DOCUMENTS

| | | | | |
|---|---|---|---|---|
| 2006/0018513 | A1* | 1/2006 | Sogawa | B60R 1/00 382/106 |
| 2007/0081210 | A1* | 4/2007 | Wilkinson | G03H 1/22 359/18 |
| 2008/0122376 | A1* | 5/2008 | Lys | H05B 33/083 315/192 |
| 2009/0315722 | A1* | 12/2009 | Hou | G08B 17/125 340/578 |
| 2010/0201812 | A1* | 8/2010 | McGibney | G06F 3/0416 348/143 |
| 2011/0043617 | A1* | 2/2011 | Vertegaal | G06F 3/011 348/78 |
| 2012/0242678 | A1* | 9/2012 | Border | G02B 27/0093 345/589 |
| 2014/0300750 | A1* | 10/2014 | Nagamune | H04N 5/2256 348/164 |
| 2014/0362164 | A1* | 12/2014 | Nakamura | H04N 1/00129 348/14.07 |

FOREIGN PATENT DOCUMENTS

| | | |
|---|---|---|
| JP | 2014-183908 A | 10/2014 |
| JP | 2014-183909 A | 10/2014 |

OTHER PUBLICATIONS

Raimondi et al, A security and surveillance application of the innovative monitoring underwater buoy systems on the protected marine area of capo gallo (Year: 2015).*

Wide area intruder detection system with a pair of transceiver cables (Year: 2007).*

Matsui et al., "Image Enhancement of Low-Light Scenes with Near-Infrared Flash Images", Proc. Asian Conference on Computer Vision (ACCV 2009), Sep. 2009, pp. 213-223.

International Search Report dated in International Patent Application No. PCT/JP2015/005549, dated Jan. 26, 2016.

* cited by examiner

IMAGING DEVICE AND IMAGING METHOD FOR COMPOSING A NON-VISIBLE LIGHT IMAGE AND A VISIBILE LIGHT IMAGE

TECHNICAL FIELD

The present disclosure relates to an imaging device and an imaging method for capturing an image.

BACKGROUND ART

Recent years, an imaging system including a color camera that captures a color (red, green, and blue: RGB) image and a NIR camera that captures a NIR (Near Infrared) image, and a half mirror is known (for example, refer to NPL 1). In the imaging system disclosed in NPL 1, in a case where a color image is captured, a flash that emits near-infrared (NIR) rays to a subject is not used, and in a case where the NIR image is captured, the above-described flash is used.

In the imaging system disclosed in NPL 1, light from the subject is divided toward two directions by the half mirror. The light divided toward two directions is imaged by the color camera and the NIR camera, and then, an RGB image and the NIR image are obtained. The RGB image is a color image. The NIR image is one of the images captured by emitting the infrared (NIR) rays and is a monochrome image. In the imaging system disclosed in NPL 1, a composite image in which a color tone is added to the monochrome image can be obtained by composing the RGB image and the NIR image.

In addition, in an image sensor that captures the image, it is known that there are an image sensor of a global shutter system and an image sensor of a rolling shutter system. Here, in a case where the image sensor of the rolling shutter system is used, a frame rate of an output image after the composition of the RGB image and the IR image is ¼ of the frame rate in a case where only the RGB image or only the IR image is output without the composition. The reason for this is that, in the image sensor of the rolling shutter system, since an exposure start timing of a first line and the last line of image sensor elements are different from each other, for example, if the images are captured over two frames across the frames, the RGB image and the IR image are composed, and then, the output image is generated.

FIG. 13 is a timing chart illustrating a specific example of an imaging operation of a monitoring camera including the image sensor performing the imaging operation according to the rolling shutter system in a comparison example.

In FIG. 13, in a frame immediately before frame b0, an imaging parameter and a light emission condition suitable for the IR image are set (a sensor register control). The sensor register control indicates that the imaging parameter held in a memory (register) (not illustrated) is set. In frame b0, the capturing of the IR image is performed in the image sensor. Since the image sensor of the rolling shutter system is used, the capturing of the IR image is performed over frame b1.

In frame b1, the imaging parameter and the light emission condition suitable for the RGB image are alternately set (sensor register setting). In this way, the IR lighting is switched to ON from OFF and the brightness of the captured IR image changes during capturing. Therefore, since the image obtainable in the frame b1 becomes a blurry image, the IR image captured in frame b1 is discarded as Dummy (a dummy image).

In a frame b2, an IR image captured by the image sensor over the frame b1 to the frame b2 is acquired.

In a frame b3, an RGB image captured by the image sensor over the frame b2 to the frame b3 is acquired. However, the imaging parameter and the light emission condition suitable for the IR image are set. In this way, since the IR lighting is switched to OFF from ON, the brightness of the captured RGB image changes during capturing. Therefore, since the RGB image obtained in the frame b3 is blurry, the RGB image captured in the frame b3 is discarded as Dummy (a dummy image).

In a frame b4, an RGB image captured by the image sensor over the frame b3 to the frame b4 is acquired, and the IR image acquired in the frame b2 and the RGB image acquired in the frame b4 are composed, and then, a composite image is obtained. Subsequently, a similar operation is repeated.

In the imaging device (for example, the monitoring camera) in the comparison example illustrated in FIG. 13, since the exposure time for the IR image and the RGB image is one frame even if it is long, as in the frames b1, b3, b5, and b7, the captured images are discarded as dummy images. Therefore, there occur such influences that: the frame rate of the output image deteriorates, the sensitivity of the IR image and the RGB image obtained from the image sensor deteriorates, and an afterimage is generated between the frame rate of the IR image and the frame rate of the RGB image. For example, in a case where the image sensor of 60 fps (frame per second) of the rolling shutter system is used, the exposure time for the RGB image is one frame (that is, ¹⁄₆₀ second) and the frame rate of the output image is decreased to 15 fps.

Furthermore, as illustrated in FIG. 14, when the image sensor of the rolling shutter system is used, since the exposure start timings of the image sensor element at the upper part and the lower part are different from each other, in a case where the subject is a moving object, a phenomenon called a dynamic distortion (a focal plane distortion) is generated.

The present disclosure has an object to provide an imaging device and an imaging method that can decrease the distortion of the output image and suppress the deterioration of the frame rate of the output image with a simple configuration even in a case of using the image sensor of the rolling shutter system.

CITATION LIST

Non-Patent Literature

NPL 1: Sosuke Matsui, Miho Shimano, Takahiro Okabe, and Yoichi Sato, "Image Enhancement of Low-Light Scenes with Near-Infrared Flash Images," in Proc. Asian Conference on Computer Vision (ACCV2009), p. 213-223, September 2009

SUMMARY OF THE INVENTION

An imaging device in the present disclosure includes: an imaging section including an imaging sensor section of a rolling shutter system; a condition designator that sets an imaging condition using first auxiliary light which is non-visible light as an imaging condition for the imaging section and an imaging condition using visible light with the first auxiliary light as non-emitted light, and alternately designates the imaging condition and the light emission condition of the first auxiliary light at a cycle of at least two frames in a time division basis; a first light emitter that emits the first auxiliary light according to the light emission condition; and an image composer that composes a non-visible light image captured by the imaging section under the imaging condition using the first auxiliary light during a first period in which the first auxiliary light is emitted and a visible light image captured by the imaging section under the imaging condition using the visible light during a second period subsequent to the first period.

In addition, an imaging method in the present disclosure in the imaging device including the imaging sensor section of a rolling shutter system in the imaging section includes: a step of setting an imaging condition using first auxiliary light which is non-visible light as an imaging condition for the imaging section and an imaging condition using visible light with the first auxiliary light as non-emitted light; a step of alternately designating the imaging condition and the light emission condition of the first auxiliary light at a cycle of at least two frames in a time division basis; a step of emitting the first auxiliary light according to the light emission condition; a step of capturing a non-visible light image by the imaging section under the imaging condition using the first auxiliary light during a first period in which the first auxiliary light is emitted; a step of capturing a visible light image by the imaging section under the imaging condition using the visible light during a second period subsequent to the first period; and a step of composing the non-visible light image and the visible light image.

According to the present disclosure, even in a case of using the image sensor of the rolling shutter system, it is possible to decrease the distortion of the output image and suppress the deterioration of the frame rate of the output image.

DESCRIPTION OF EMBODIMENTS

In the present embodiment described hereinafter, an example of an imaging device that can decrease a distortion of an output image and suppress the deterioration of a frame rate of the output image with a simple configuration even in a case of using an image sensor of a rolling shutter system, will be described.

The imaging device in the present embodiment described below is applied, for example, to a monitoring camera. Therefore, in order to make the explanation easy to understand, the description will be made with a monitoring camera as an example.

The Present Embodiment

Figure 1:
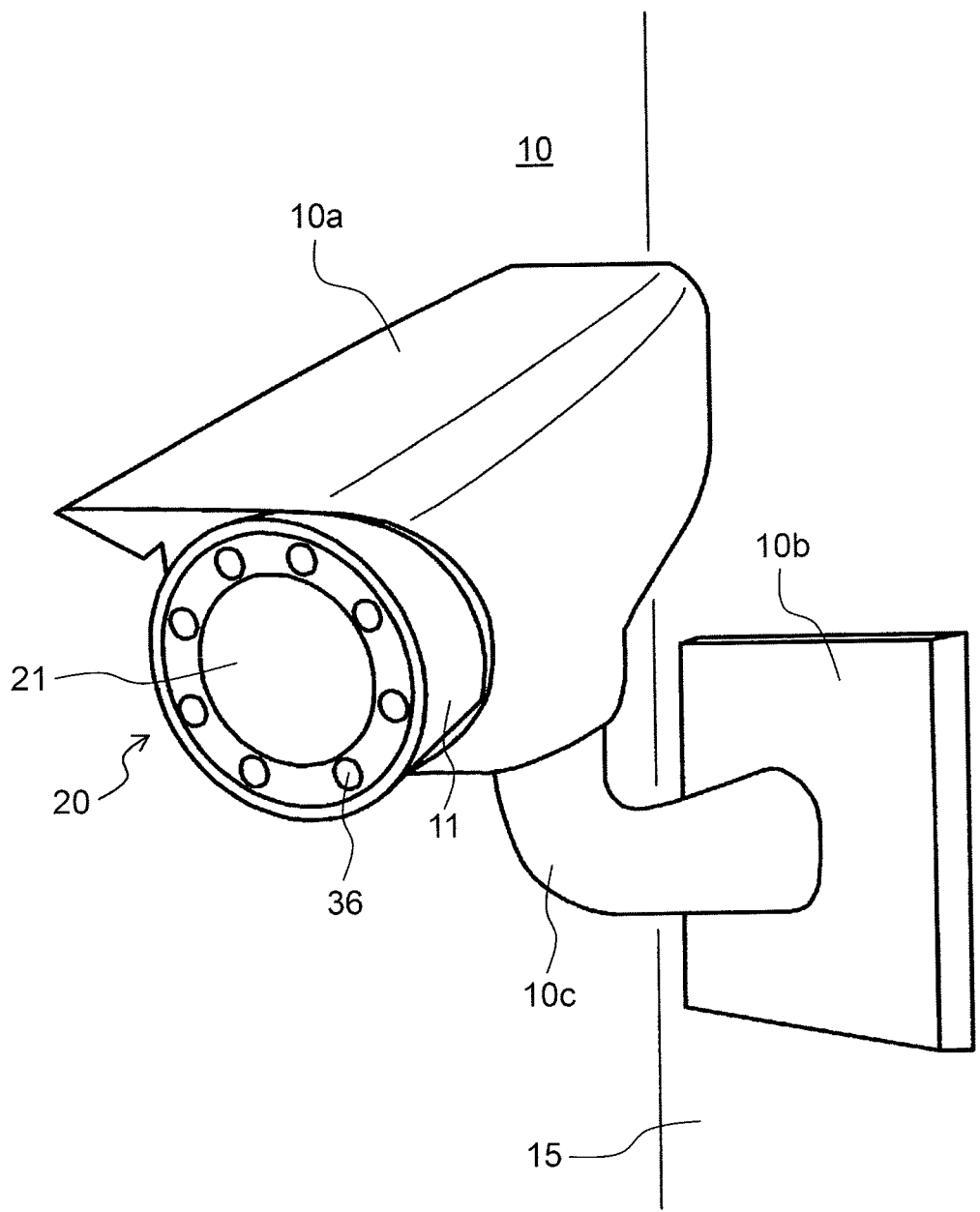
FIG. 1 is a schematic diagram illustrating an example of an external view of a monitoring camera in the present embodiment.

FIG. 1 is a schematic diagram illustrating an example of an external view of monitoring camera 10 in the present embodiment. Monitoring camera 10 illustrated in FIG. 1 includes housing 10a and is fixed to wall surface 15 by arm section 10c and mounter 10b connected to housing 10a. Imaging section 20 is accommodated in lens barrel 11 at the front of housing 10a.

Imaging section 20 includes lens 21 at the front thereof and is directed so as to image a predetermined region including a subject. In addition, IR_LED section 36 that emits IR lighting (or referred to as "IR light") is provided in lens barrel 11 adjacent to imaging section 20. In the illustration in FIG. 1, eight IR_LED sections 36 are provided. However, the number of IR_LED section 36 is not limited to eight.

Figure 2:
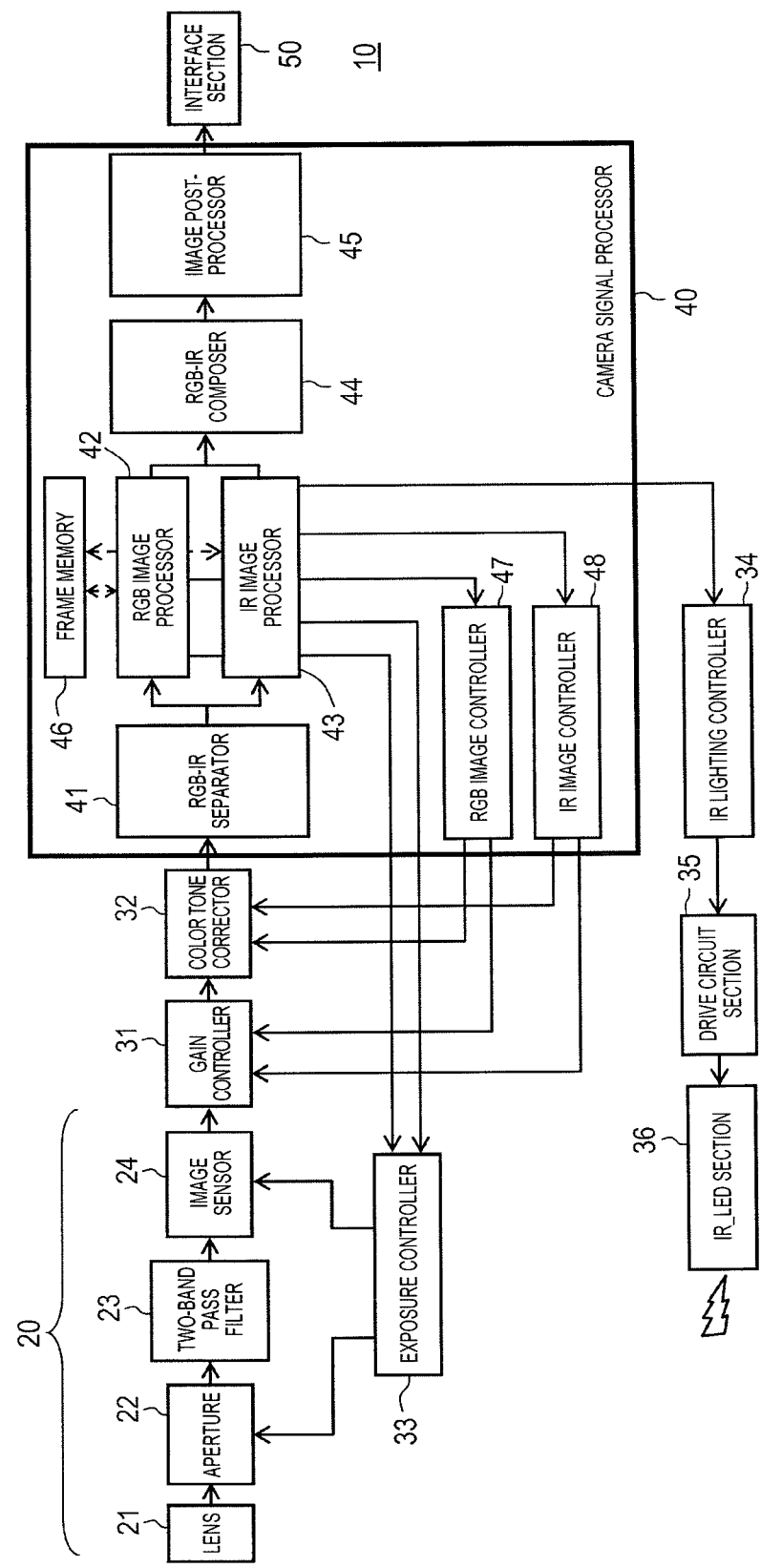
FIG. 2 is a block diagram illustrating a configuration example of the monitoring camera in the present embodiment.

FIG. 2 is a block diagram illustrating a configuration example of monitoring camera 10 in the present embodiment.

Monitoring camera 10 includes imaging section 20. Imaging section 20 includes lens 21, aperture 22, two-band pass filter 23 and image sensor 24. Lens 21, aperture 22, two-band pass filter 23, and image sensor 24 are arranged in the order in the light axis direction respectively. Lens 21 is positioned in front of imaging section 20 and image sensor 24 is positioned behind imaging section 20. Imaging section 20 captures an image in which the subject is included according to imaging conditions for capturing the image.

Lens 21 collects the light incident on imaging section 20. Aperture 22 adjusts an amount of light incident on via lens 21 according to an instruction from exposure controller 33.

Two (dual)-band pass filter 23 is a filter arranged in front of image sensor 24 and is designed to make the transmittance of the light having a wavelength in a visible light region and a wavelength in an infrared region be high and make the transmittance of the light having a wavelength in other ranges be low.

Image sensor 24 performs the imaging operation according to the rolling shutter system and includes a color image sensor in which color filter 25 (refer to FIGS. 4A and 4B) is built in at the front surface thereof. Image sensor 24 is, for example, a complementary metal-oxide semiconductor (CMOS) sensor.

Image sensor 24 is configured to include a plurality of lines of the image sensor elements as an imaging sensor section, which are arrayed in a row in a direction of a straight line, and receives the light from the subject via two-band pass filter 23 and color filter 25 in each lines of the image sensor elements, and then, converts the light to an electric signal to obtain an image. Image sensor 24 obtains the image in which an IR component is comparatively large (IR image) and the image in which the IR component is comparatively small (RGB image) in a time division basis (periodically). Image sensor 24 may perform imaging while changing the exposure amount and the exposure time by image sensor 24 itself using the known method in response to the instruction from exposure controller 33.

In addition, monitoring camera 10 includes gain controller 31, color tone corrector 32, exposure controller 33, and camera signal processor 40.

Gain controller 31 adjusts a gain of an amplifier (not illustrated) using a gain designated by RGB image controller 47 or IR image controller 48 such that the signal level of the image output from image sensor 24 is amplified. Hereinafter, the gain of the amplifier will be simply referred to as a gain.

Color tone corrector 32 corrects the color tone of the image (for example, the IR image or the RGB image) output from image sensor 24 using a correction amount designated by RGB image controller 47 or IR image controller 48. Color tone includes, for example, a white balance.

Exposure controller 33 adjusts an aperture value of aperture 22 and the exposure time of image sensor 24 according to the designation from RGB image processor 42 or IR image processor 43.

Camera signal processor 40 performs various kinds of signal processing on the image signal. Camera signal processor 40 includes RGB-IR separator 41, RGB image processor 42, IR image processor 43, RGB-IR composer 44, image post-processor 45, frame memory 46, RGB image controller 47, and IR image controller 48.

RGB-IR separator 41 obtains the RGB image and the IR image from color tone corrector 32 via the same signal line in a time division basis and separates the images into the RGB image and the IR image. RGB-IR separator 41 outputs the RGB image to RGB image processor 42 and outputs the IR image to IR image processor 43.

RGB image processor 42 performs predetermined image processing on the separated RGB image and outputs the result to RGB-IR composer 44. The image processing by RGB image processor 42 includes, for example, gradation correction, color tone correction, and noise removal with respect to the RGB image.

RGB image processor 42 as an example of a condition designator gives an instruction of an imaging condition (imaging parameter) suitable for capturing the RGB image to, for example, RGB image controller 47 for each period of at least two frames. This imaging parameter includes, for example, the gain and the correction amount of the color tone correction. Similarly, RGB image processor 42 gives an instruction of an imaging condition (for example, exposure time) suitable for capturing the RGB image to, for example, exposure controller 33 for each period of at least two frames.

The imaging parameter includes, for example, the gain, the exposure time, the exposure amount, the color tone correction amount (for example, adjustment amount of the white balance), and the gradation correction amount. The information on the imaging parameter is held in, for example, a memory (not illustrated) in monitoring camera 10. As the imaging parameter, an imaging parameter for capturing the RGB image and an imaging parameter for capturing the IR image may be independently provided.

In a case where there is a difference between a first RGB image component and a second RGB image component, RGB image processor 42 may update the imaging parameter according to the difference. The first RGB image component is an RGB image component estimated to be obtained by the imaging parameter instructed to exposure controller 33 and RGB image controller 47. The second RGB image is an RGB image component actually acquired from RGB-IR separator 41. The updated imaging parameter may be sent to RGB image controller 47 and exposure controller 33. RGB image processor 42 may perform the image processing (for example, the gradation correction and the color tone correction) according to the difference.

In addition, RGB image processor 42 may perform the image processing (for example, the gradation correction and the color tone correction) in a case where an operation section (not illustrated) receives an operation to perform specific image processing from the user.

RGB image processor 42 is an example of a condition designator that designates the imaging condition and the light emission condition in a time division basis.

RGB image controller 47 gives an instruction to gain controller 31 to control the gain (for example, to increase the gain) according to, for example, the designated imaging parameter, and gives an instruction to color tone corrector 32 to correct the color tone.

IR image processor 43 performs predetermined image processing on the separated IR image and outputs the result to RGB-IR composer 44. The image processing by IR image processor 43 includes, for example, the gradation correction, the color tone correction, and the noise removal on the IR image.

IR image processor 43 as an example of the condition designator gives an instruction of the imaging condition (the imaging parameter) suitable for capturing of the IR image to, for example, IR image controller 48 for each period of at least two frames. This imaging parameter includes, for example, the gain and the correction amount of the color tone correction. Similarly, IR image processor 43 gives an instruction of an imaging condition (for example, exposure time) suitable for capturing the IR image to, for example, exposure controller 33 for each period of at least two frames.

IR image processor 43 gives an instruction of the light emission condition suitable for capturing the of the IR image to, for example, IR lighting controller 34. The IR light is infrared light and includes NIR light (near infrared light). The light emission condition includes information on the presence or absence of the IR light emitted by IR_LED section 36 or the light emission amount of the IR light. The information on the light emission condition is held, for example, in a memory (not illustrated) in camera signal processor 40 of monitoring camera 10.

In a case where there is a difference between a first IR image component and a second IR image component, IR image processor 43 may update at least one of the imaging parameter and the light emission condition according to the difference. The first IR image component is an IR image component estimated to be obtained by the imaging parameter instructed to exposure controller 33 and IR image controller 48, and the light emission condition instructed to IR lighting controller 34. The second IR image component is an IR image component actually acquired from RGB-IR separator 41. The updated imaging parameter may be sent to IR image controller 48 and exposure controller 33. The updated light emission condition may be sent to IR lighting controller 34. IR image processor 43 may perform the image processing (for example, the gradation correction and the color tone correction) according to the difference.

In addition, IR image processor 43 may perform the image processing (for example, the gradation correction and the color tone correction) in a case where an operation section (not illustrated) receives an operation to perform specific image processing from the user.

IR image processor 43 is an example of the condition designator that designates the imaging condition and the light emission condition in a time division basis.

IR image controller 48 gives an instruction to gain controller 31 to control the gain (for example, to decrease the gain) according to, for example, the designated imaging parameter, and gives an instruction to color tone corrector 32 to correct the color tone.

RGB-IR composer 44 as an example of an image composer composes the RGB image captured using the visible light and the IR image captured using the IR light (IR lighting) which is the invisible light, at a predetermined timing (refer to the description below) using the known image composition method disclosed in, for example, NPL 1, and generates a composite image (that is, an output image from monitoring camera 10). Specifically, RGB-IR composer 44 extracts, for example, a color tone component from the RGB image and extracts an edge component and a gradation component from the IR image, and generates the output image by performing the composition using each of the extracted components. By composing the RGB image and the IR image and generating the output image, RGB-IR composer 44 can generate a color image having bright colors and vivid outlines even in the low-light environment.

Image post-processor 45 performs predetermined post-processing (for example, the image recognition processing on the composite image, the amplification correction for amplifying the signal level of the composite image, the gradation correction on the composite image, and the color tone correction on the composite image) on the composite image.

Frame memory 46 stores image data, and transmits and receives the image data to and from RGB image processor 42 and IR image processor 43. The image data stored in frame memory 46 is subject to the image composition by, for example, RGB-IR composer 44, and includes image data of the previously captured RGB image or the IR image.

In addition, monitoring camera 10 includes IR lighting controller 34, drive circuit section 35, IR_LED section 36, and interface section 50.

IR lighting controller 34 as an example of a first light emitter sends a control signal indicating the presence or absence of the light emission by IR_LED section 36 to drive circuit section 35 according to, for example, the light emission condition from IR image processor 43. In order to perform Pulse Width Modulation (PWM) control on IR_LED section 36 according to the light emission condition from, for example, IR image processor 43 during the imaging period of the non-visible light image (the IR image) and other than the imaging period of the visible light image (the RGB image), IR lighting controller 34 sends a PWM signal to drive circuit section 35.

Drive circuit section 35 receives the control signal or the PWM signal from, for example, IR lighting controller 34 and controls the presence or absence of the light emission of IR_LED section 36 or the light emission amount.

IR_LED section 36 as an example of the first light emitter emits the non-visible IR light to the subject using the light emission amount controlled by drive circuit section 35. That is, IR_LED section 36 emits the IR light to the subject.

Interface section 50 outputs the composite image (the output image) output from camera signal processor 40 to the outside. Interface section 50 includes a universal serial bus (USB) for outputting the composite image to, for example, an external storage medium. Interface section 50 includes a communication interface (for example, a LAN terminal for the connection to the local area network (LAN)) for transmitting the composite image to, for example, an external communication device (for example, an information processing device such as a personal computer (PC) having a communication function). Interface section 50 may output the RGB image or the IR image before the generation of the composite image to the outside.

Next, the image captured by imaging section 20 will be described.

The image captured by imaging section 20 includes, for example, the RGB image, the IR image, and other images. The RGB image is an image captured by image sensor 24 based on ambient light (that is, ambient light existing in nature) during a non-light emission period (a second period) in which the IR light is not emitted by IR_LED section 36 and the IR light is not emitted to the subject. On the other hand, the IR image is an image captured by image sensor 24 based on the IR light during a light emission period (a first period) in which the IR light is emitted by IR_LED section 36 and the IR light is emitted to the subject.

In capturing the RGB image, the control is performed such that the color tone component of the RGB image increases according to the imaging parameter. For example, RGB image controller 47 or exposure controller 33 controls the exposure amount, the gain, or the correction amount of the color tone according to the imaging parameter. For example, as the exposure amount increases or as the gain increases, the color tone component increases. Therefore, the control is performed such that the exposure amount increases and the gain increases. In this case, as the gain increases, a noise component of the RGB image may increase. In addition, in the RGB image, the edge component of the subject is not sufficiently large and the edge may be unclear.

In capturing the IR image, the control is performed such that the gradation component and the edge component of the IR image increase. For example, IR image controller 48 or exposure controller 33 controls the exposure amount, the gain, or the correction amount of the color tone according to the imaging parameter. For example, IR lighting controller 34 controls the light emission amount of the IR light according to the light emission condition. In the IR image, the color tone component of the IR image may be small. In the IR image, it is preferable that the noise component of the IR image be small.

In the present embodiment, the IR light as an example of non-visible light is mainly emitted to the subject and the IR image can be obtained. However, the non-visible light other than the IR light may be emitted. For example, instead of the IR light, visible light may be emitted or ultraviolet light may be emitted as long as the necessary edge component and the gradation component can be acquired from the emitted light. In a case of using the IR light, since the gradation component and the edge component of the obtainable image can easily be emphasized, it is possible to easily obtain the desired gradation component and the edge component even in a low-light environment.

Figure 3:
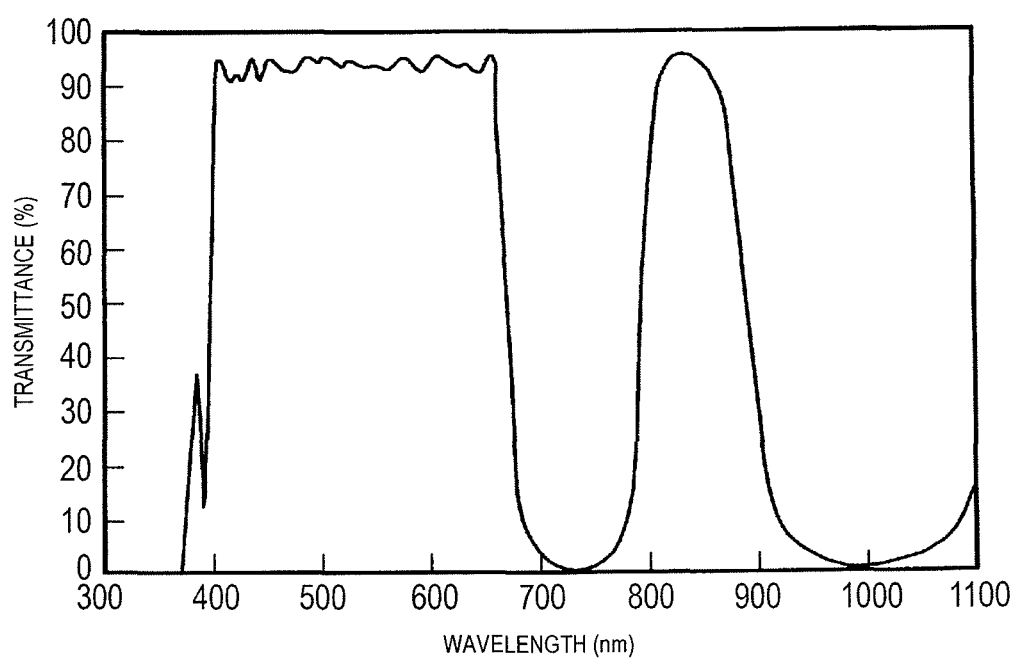
FIG. 3 is a graph illustrating an example of optical properties of two-band pass filter of the monitoring camera in the present embodiment.

FIG. 3 is a graph illustrating an example of optical properties of two-band pass filter 23 of monitoring camera 10 in the present embodiment. Two-band pass filter 23 has high transmittance at the visible light region in which the wavelength is in the rage of approximately 400 nm to 700 nm and at the infrared region in which the wavelength is in the range of approximately 800 nm to 900 nm.

The visible light that passes through two-band pass filter 23 among the light from the subject is used in the generation of the RGB image. The infrared light that passes through two-band pass filter 23 among the lights from the subject is used in the generation of the IR image.

Figure 4A:
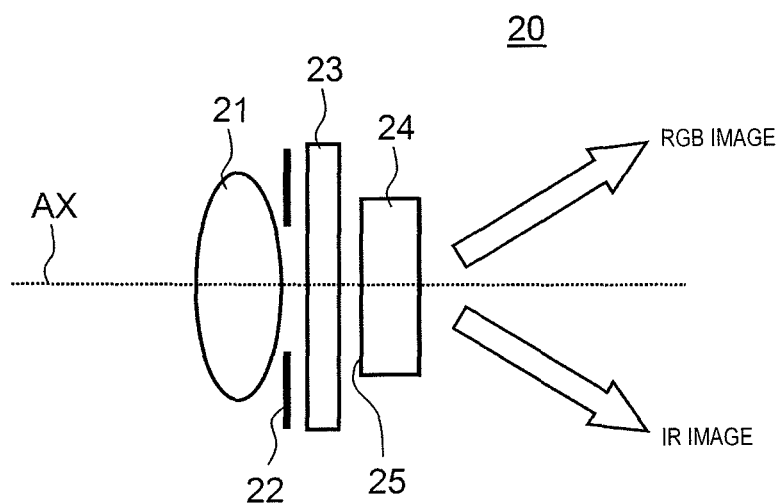
FIG. 4A is a schematic diagram illustrating a configuration example of an imaging section of the monitoring camera in the present embodiment.
Figure 4B:
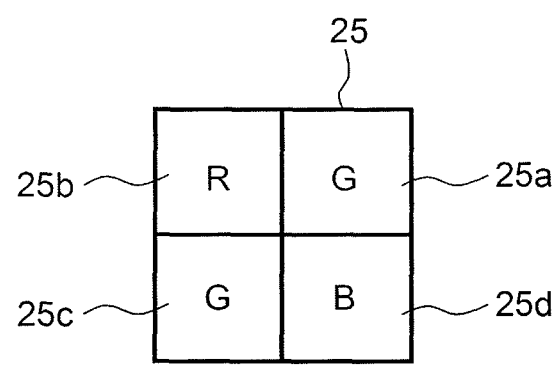
FIG. 4B is a schematic diagram illustrating a configuration example of the imaging section of the monitoring camera in the present embodiment.

FIGS. 4A and 4B are schematic diagrams illustrating configuration examples of imaging section 20 of monitoring camera 10 in the present embodiment. FIG. 4A is a schematic diagram illustrating an example of an arrangement relationship between respective parts of imaging section 20. In FIG. 4A, imaging section 20 includes lens 21, aperture 22, two-band pass filter 23, and image sensor 24 that are arranged on an optical axis AX. Color filter 25 is included at the front surface of image sensor 24.

FIG. 4B is a schematic diagram illustrating an example of a Bayer array of color filter 25. Color filter 25 is configured to include two G-filter sections 25a and 25c that transmit a G (green) light, R-filter section 25b that transmits an R (red) light, and B-filter section 25d that transmits a B (blue) light. Each of filter sections 25a to 25d also transmits the IR light as well as the light of each color.

Image sensor 24 generates the RGB image and the IR image in the time division basis by, for example, the imaging parameter and the presence or absence of the emission of the IR light being switched by exposure controller 33 at a cycle of at least two frames.

For example, in a case of obtaining the RGB image in the low-light environment, RGB image controller 47 sets the exposure time as the imaging parameter to be long and sets the gain as the imaging parameter to be large. In the state set as described above, image sensor 24 acquires the RGB image.

For example, in a case of obtaining the IR image in the low-light environment, IR lighting controller 34 controls drive circuit section 35 such that IR_LED section 36 emits the IR light toward the subject. In addition, IR image controller 48 sets the exposure time as the imaging parameter to be short and sets the gain as the imaging parameter to be small. In the state set as described above, image sensor 24 acquires the IR image. The low-light indicates, for example, a case where the illuminance is equal to or lower than 0.1 lux.

In FIGS. 3, 4A and 4B, a case using two-band pass filter 23 is illustrated. However, light other than the IR component may be included in the light received by image sensor 24. For example, instead of color filter 25, an all band pass filter, a visible cut filter, or an infrared band pass filter may be used. Even if the filters other than two-band pass filter 23 are used, they can be used as long as the predetermined gradation component and the edge component are obtainable from the image obtained instead of the IR image.

Figure 5:
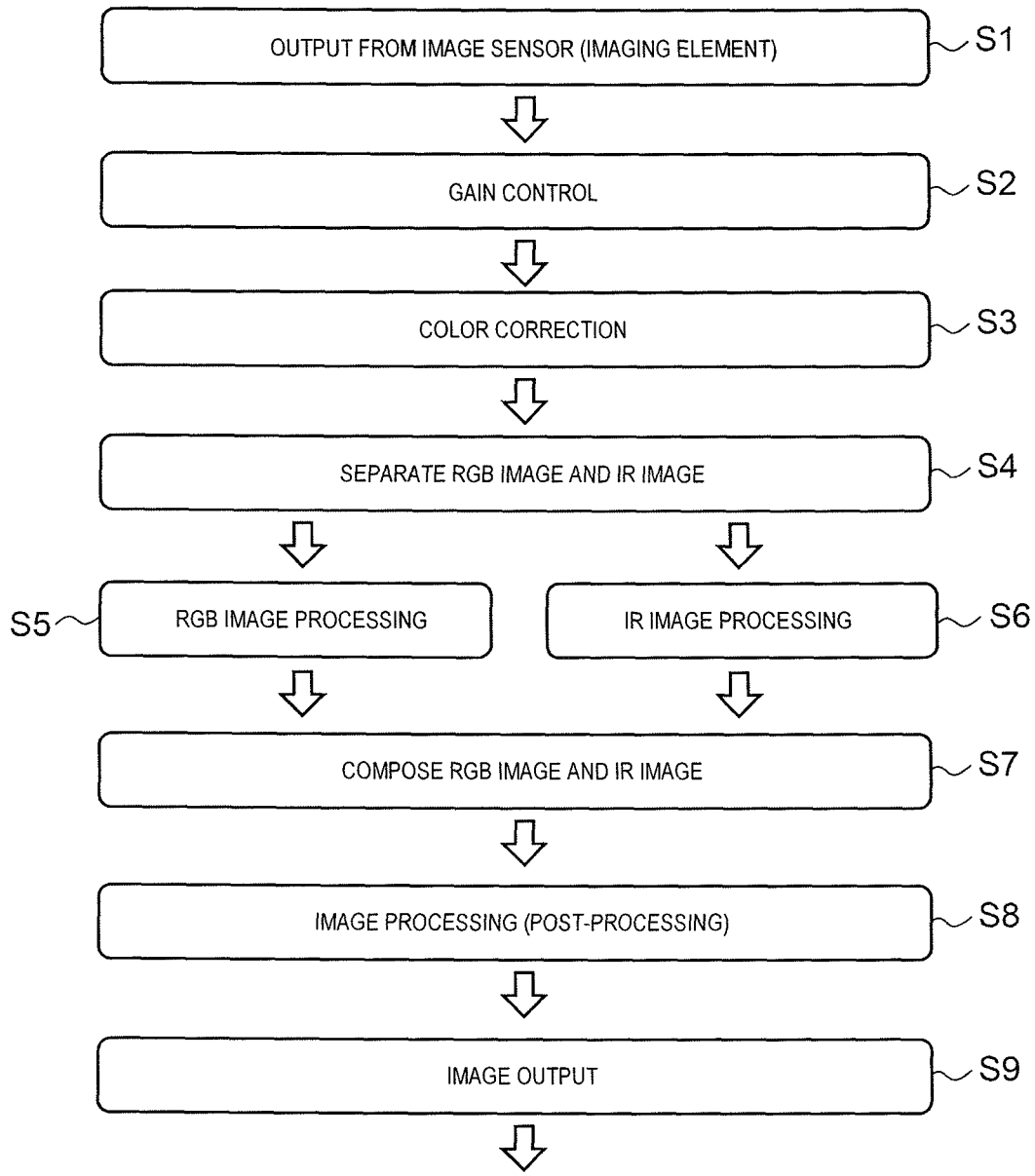
FIG. 5 is a flowchart explaining an example of procedure of an overall imaging operation in the monitoring camera in the present embodiment.

Next, an operation example of monitoring camera 10 will be described with reference to FIG. 5. FIG. 5 is a flowchart explaining an example of procedure of an overall imaging operation in monitoring camera 10 in the present embodiment.

In FIG. 5, image sensor 24 receives the light from the subject over the exposure time (a period at least equal to or longer than two frames (for example, a period equal to or longer than 1/60 second) of the frame rate (for example, 120 fps) of image sensor 24, details will described below) of the RGB image or the IR image designated by exposure controller 33, and obtains the RGB image or the IR image, and then, outputs the light to gain controller 31 (S1).

Gain controller 31 amplifies the signal of the RGB image among the images from image sensor 24 using the gain designated by RGB image controller 47 (S2). Gain controller 31 amplifies the signal of the IR image among the images from image sensor 24 using the gain designated by IR image controller 48 (S2).

Color tone corrector 32 corrects the color tone of the RGB image using the correction amount of the color tone designated by RGB image controller 47 (S3). Color tone corrector 32 corrects the color tone of the IR image using the correction amount of the color tone designated by IR image controller 48 (S3).

RGB-IR separator 41 separates the RGB image and the IR image from color tone corrector 32 (S4). RGB-IR separator 41 sends the RGB image to RGB image processor 42 and sends the IR image to IR image processor 43. That is, RGB-IR separator 41 switches the output destination of the images in the time division basis (specifically, for each period of at least two frames).

RGB image processor 42 performs predetermined image processing on the RGB image from RGB-IR separator 41 (S5). IR image processor 43 performs predetermined image processing on the IR image from RGB-IR separator 41 (S6).

RGB image controller 47 and exposure controller 33 designate, for example, the exposure amount, the exposure time, the gain, and the correction amount of the color tone according to, for example, the imaging parameter for capturing the RGB image.

IR image controller 48, exposure controller 33, and IR lighting controller 34 designate, for example, the exposure amount, the exposure time, the gain, the correction amount of the color tone, the presence or absence of the emission of the IR light, and the light emission amount of the IR light according to, for example, the imaging parameter for capturing the IR image and the light emission condition.

RGB-IR composer 44 composes the RGB image on which the image-processing is performed by RGB image processor 42 and the IR image on which the image processing is performed by IR image processor 43 at a predetermined timing (refer to the description below) (S7).

Image post-processor 45 performs predetermined post-processing on the composite image (the output image) (S8). Interface section 50 outputs the composite image (the output image) on which the post-processing is performed to the outside (S9).

As described above, according to the example of the operation by monitoring camera 10 illustrated in FIG. 5, monitoring camera 10 can compose the RGB image along the imaging parameter for capturing the RGB image and the IR image along the imaging parameter for capturing the IR image. Monitoring camera 10 can obtain the image having bright colors and vivid outlines by the image composition even in the low-light environment, and thus, it is possible to easily improve the quality of the captured image.

Figure 6:
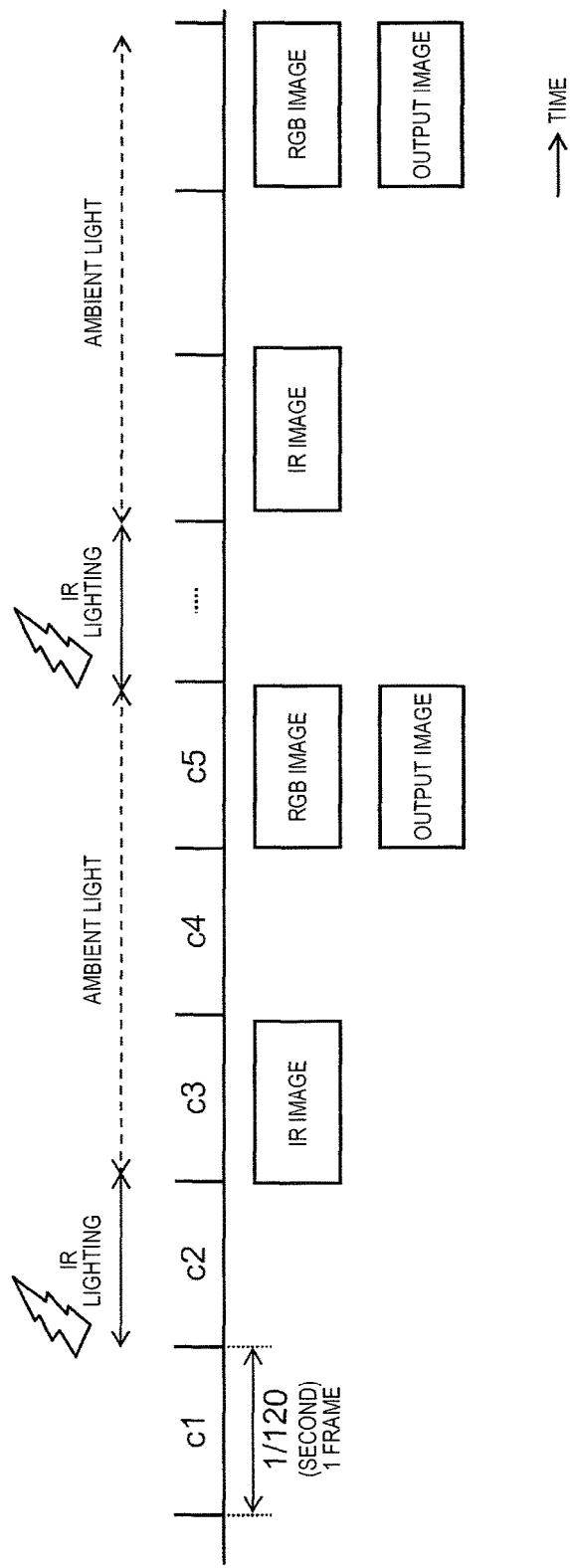
FIG. 6 is an explanatory diagram schematically explaining an example of the imaging operation in the monitoring camera in the present embodiment including an image sensor that performs an imaging operation according to a rolling shutter system.

FIG. 6 is an explanatory diagram schematically explaining an example of the imaging operation in monitoring camera 10 in the present embodiment including image sensor 24 that performs the imaging operation according to a rolling shutter system.

In a case where the image sensor 24 is configured to include a CMOS sensor, for example, the RGB image or the IR image is captured using, for example, a line exposure sequential reading system (the rolling shutter system). In the rolling shutter system, the exposure timing (in other words, the image capturing timing) of the image becomes different for each lines of the image sensor elements in image sensor 24, and thus, the period from starting to ending of capturing the RGB image and the IR image spans over two consecutive frames without fitting within one frame.

Figure 14:
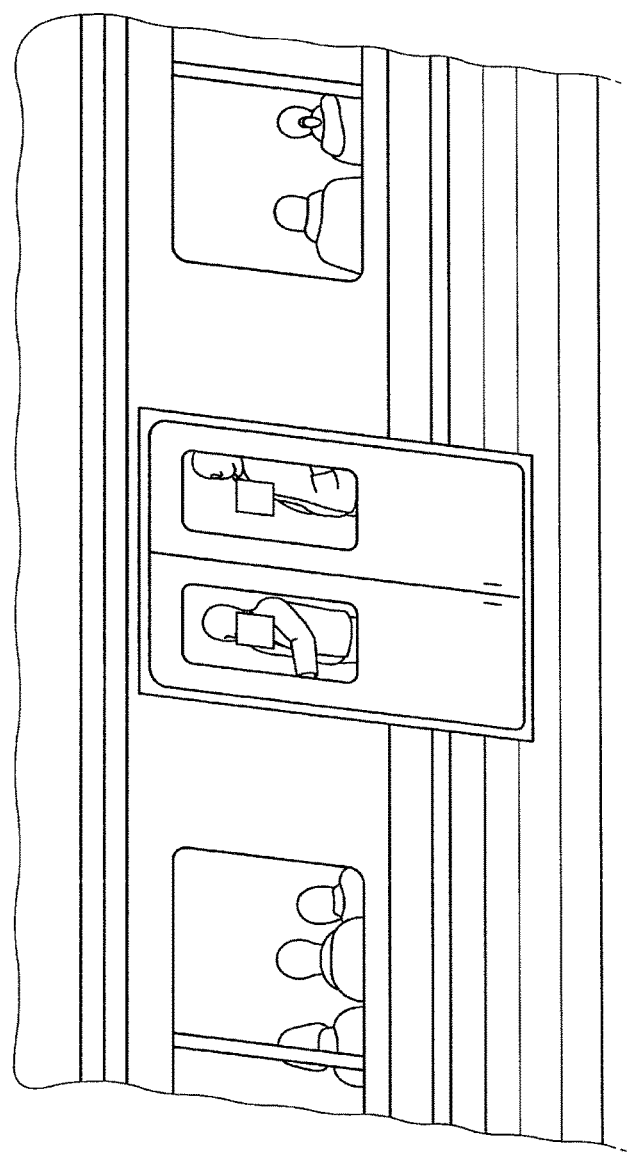
FIG. 14 is a diagram illustrating an example of an output image in a case using the image sensor of the rolling shutter system.

Therefore, for example, in a monitoring camera in the comparison example illustrated in FIG. 14, when the capturing (exposure) timing of the RGB image and the IR image is switched, the RGB image and the IR image in the first frame at the time of switching are discarded. Therefore, the frame rate in the rolling shutter system is ½ of that in the global shutter system. In addition, the IR light is emitted over two frames for capturing the IR image such that the IR light is emitted during the imaging period of the IR image.

In the present embodiment illustrated in FIG. 6, for example, image sensor 24 of the rolling shutter system having the frame rate of 120 fps is used, and thus, the IR image is captured during the exposure period of two frames (in other words, imaging period). Actually, since the exposure start timing of the first line of the image sensor elements in image sensor 24 and the exposure start timing of the last line are different from each other, the IR image is captured over three frames of frames c1, c2, and c3. In addition, similarly, the RGB image is also captured during the exposure period of two frames (in other words, imaging period), the RGB image is captured over three frames of frames c3, c4, and c5. In frames subsequent to frame c5, similarly as in frames c1 to c5, the capturing of the IR image and the capturing of the RGB image are repeated.

Specifically, in frame c2 next to the first frame c1, the IR light emitting is started, and the IR light is emitted over a predetermined period (refer to the description below). In frame c3, image sensor 24 receives the light that passes through color filter 25 as the IR image.

In addition, in frame c3, the RGB image is started to be captured using the ambient light which is the visible light, and the capturing of the RGB image is continued to be performed until frame c5. In addition, in frame 5c, RGB-IR composer 44 starts to compose the IR image obtained in frame c3 and the RGB image obtained in frame c5 in parallel with the capturing of the RGB image, and then, generates the composite image (output image). Thereafter, the similar operations are repeated.

In FIG. 6, a case where the IR image is captured first and the RGB image is captured later is described. However, the order may be reversed. By capturing the IR image first and capturing the RGB image later, a difference of capturing time points between the IR image and the RGB image can be small compared to the case of capturing the images in reverse order.

For example, in capturing the RGB image, in a case of acquiring many color tone components in the low-light, the exposure time is set to be long. That is, the imaging period of the RGB image is set to be long. On the other hand, in capturing the IR image, even in a case of acquiring many edge components and the gradation components, since the IR light is emitted, the exposure time may not be set to be long. Therefore, the imaging period for the RGB image becomes longer than the imaging period for the IR image. Therefore, by capturing the IR image prior to the RGB image, a difference between an IR image capturing time point, and an RGB image capturing time point and the composite image generation time point can be small, and thus, the afterimage of the composite image can be reduced.

In FIG. 6, the RGB image used in the generation of the composite image may be captured over a plurality of frames. In this way, the RGB image having a high color tone can be obtained.

Figure 7:
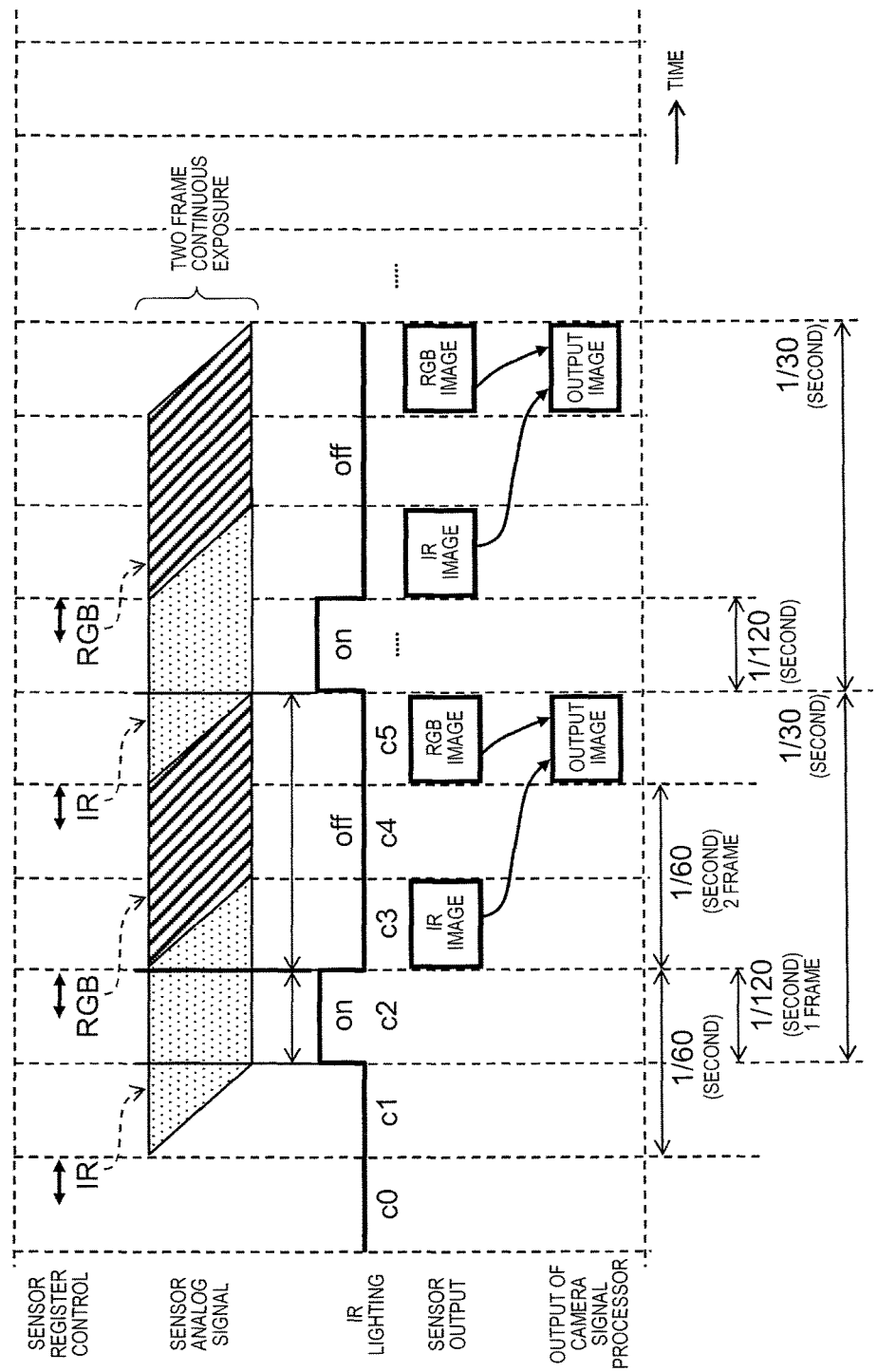
FIG. 7 is a timing chart illustrating a specific example of an imaging operation in the monitoring camera in the present embodiment including the image sensor that performs the imaging operation according to the rolling shutter system.

FIG. 7 is a timing chart illustrating a specific example of an imaging operation in monitoring camera 10 in the present embodiment including image sensor 24 that performs the imaging operation according to the rolling shutter system.

In FIG. 7, in frame c0, IR image processor 43 sets the imaging parameter and the light emission condition suitable for the IR image to, for example, exposure controller 33, IR lighting controller 34 and IR image controller 48 respectively (sensor register control). The sensor register control represents that the imaging parameter held in the memory (register) (not illustrated) is set in each section (specifically, exposure controller 33, IR lighting controller 34, and IR image controller 48).

In frame c1, the imaging (exposure) in the first line of the image sensor elements in image sensor 24 is started, and the capturing of the IR image is performed until frame c3 in the image sensor. In frame c2, IR lighting controller 34 causes IR_LED section 36 to emit the IR light over the predetermined period (refer to the description below). In frame c3, image sensor 24 acquires the IR image captured during the period when the IR light is emitted from IR_LED section 36. The exposure (imaging) period for capturing the IR image in image sensor 24 is two frames (1/60 second). Since the frame rate of image sensor 24 is 120 fps, and thus, one frame is 1/120 second.

In addition, in frame c2, RGB image processor 42 sets the imaging parameter and the light emission condition suitable for the RGB image to, for example, exposure controller 33, IR lighting controller 34 and RGB image controller 47 respectively (sensor register control). The sensor register control represents that the imaging parameter held in the memory (register) (not illustrated) is set in each section (specifically, exposure controller 33, IR lighting controller 34, and RGB image controller 47).

In frame c3, the imaging (exposure) in the first line of the image sensor elements in image sensor 24 is started, and the capturing of the RGB image is performed until frame c5 in the image sensor. In frames c3 to c5, IR lighting controller 34 does not cause IR_LED section 36 to emit the IR light. In frame c5, image sensor 24 acquires the captured RGB image. The exposure (imaging) period for capturing the RGB image in image sensor 24 is two frames (1/60 second).

In addition, in frame c5, the IR image acquired in frame c3 and the RGB image acquired in frame c5 are composed, and then, the composite image (the output image) is generated and output to image post-processor 45. Subsequent to frame c5, the operations similar to the operations in frames c0 to c5 are repeated.

In this way, by setting the exposure time (the imaging time) of the IR image and the exposure time (the imaging time) of the RGB image to be two frames respectively, and further by setting the period of IR lighting to be in the exposure time of the IR image and not to be in the exposure time of the RGB image, monitoring camera 10 in the present embodiment can obtain the frame rate of the output image as 30 fps, and thus, the deterioration of the image quality of the output image can be suppressed without discarding the Dummy (the dummy image) as in the comparison example, and it is possible to suppress the deterioration of the sensitivity of the IR image and the RGB image and the generation of the afterimages between the frames.

Figure 8:
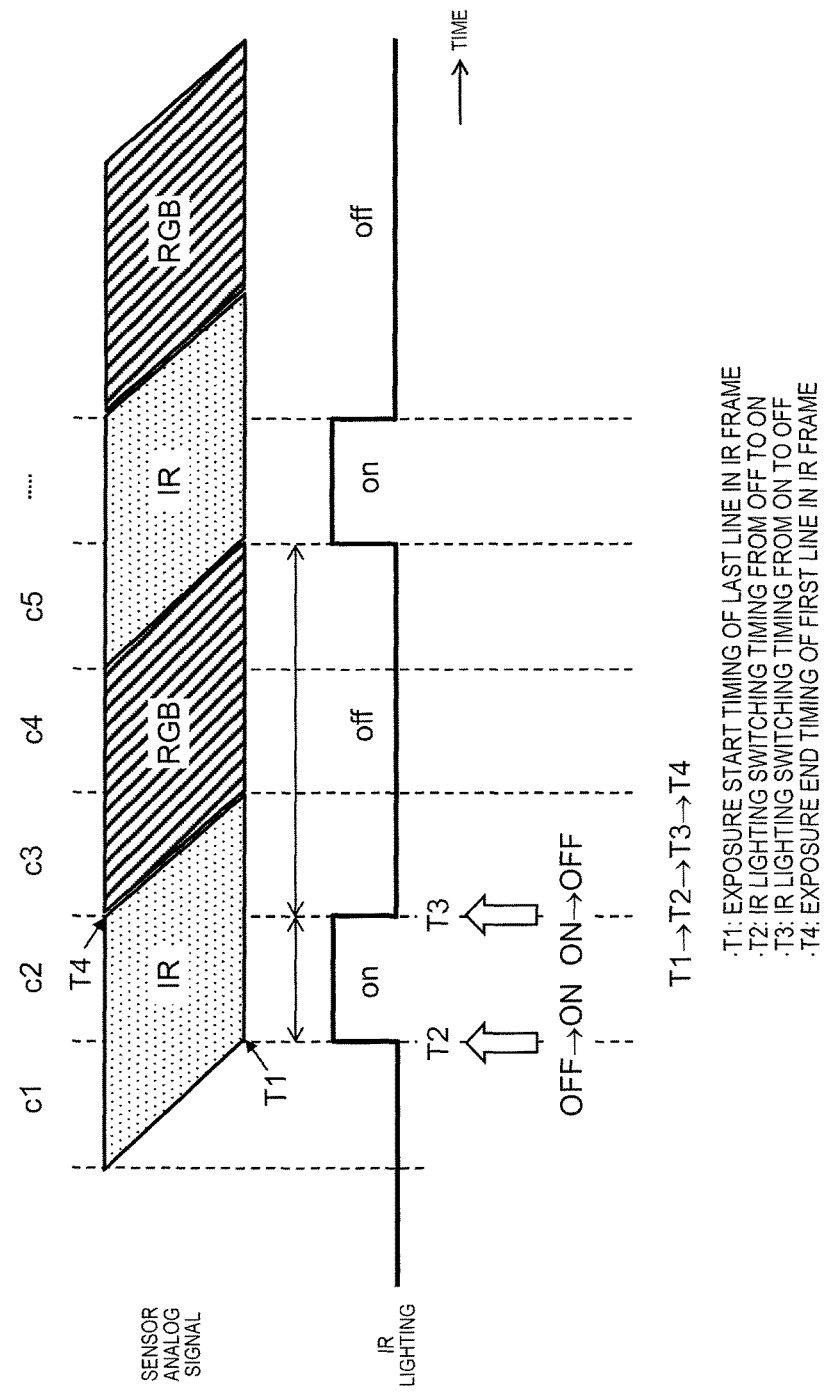
FIG. 8 is an explanatory diagram illustrating an example of relationships between a first period (a period of IR lighting ON) during which the IR lighting is emitted and an exposure time of the image sensor.

FIG. 8 is an explanatory diagram illustrating an example of relationships between the first period (the period of IR lighting ON) during which the IR lighting is emitted and an exposure time of image sensor 24.

An IR image acquisition period during which the IR image is acquired by image sensor 24 is a period from frames c1 to c3 and is shorter than the time when the IR lighting is ON. RGB image acquisition period during which the RGB image is acquired by image sensor 24 is a period from frames c3 to c5 and is almost same as the time when the IR lighting is OFF. The IR image is captured under the IR lighting and the RGB image is captured under the ambient light.

In this way, the IR light is emitted during the period when the IR image is captured, and thus, it is possible to acquire the image of the subject in which the IR component is emphasized. In addition, in the period during which RGB image is captured, the IR light is not emitted, and thus, it is possible to acquire the image of the subject in which the IR component is not emphasized. Accordingly, for example, accuracy of extracting the edge component or the like from the IR image can be improved, and the accuracy of extracting the color tone component from the RGB image can be improved. Accordingly, in the composite image, for example, the color tone component of which the accuracy of extraction is high can be added to the edge component of which the accuracy of extraction is high, and thus, it is possible to improve the image quality of the composite image.

In FIG. 8, IR lighting controller 34 causes IR_LED section 36 to emit the IR lighting between a time point T2 and a time point T3. The time point T2 is the timing when the emission of the IR lighting is switched from an OFF state to an ON state. The time point T3 is the timing when the emission of the IR lighting is switched from the ON state to the OFF state.

The time point T2 at which the emission of the IR lighting starts comes later than a time point T1 indicating a timing when the exposure of the last line of the frame of the IR image (IR frame) starts. In addition, the time point T3 at which the emission of the IR lighting ends comes prior to a time point T4 indicating a timing when the exposure of the first line of the frame of the IR image (IR frame) ends.

Figure 9:
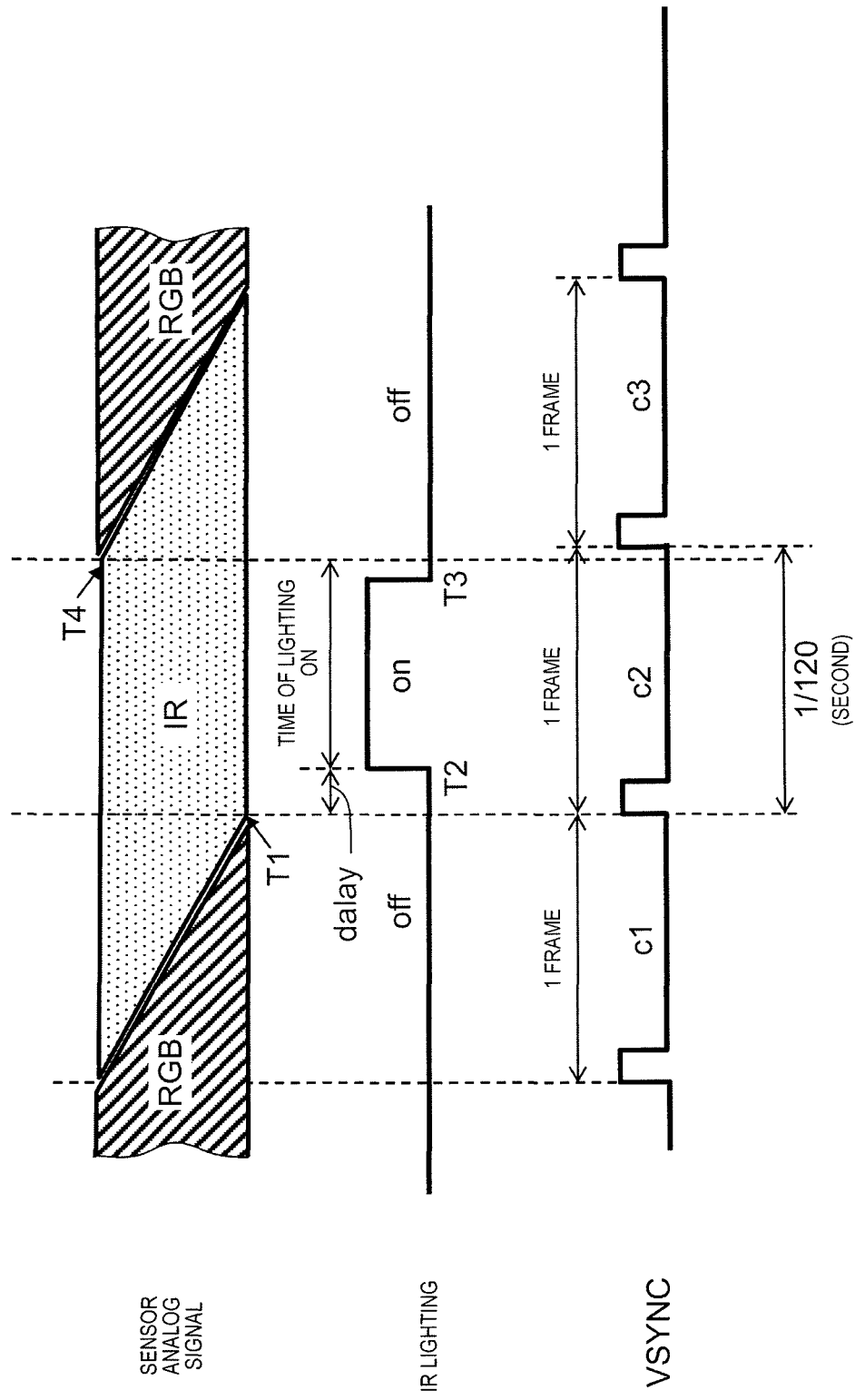
FIG. 9 is an explanatory diagram illustrating an example of relationships between the first period (the period of IR lighting ON) during which the IR lighting is emitted, the exposure time of the image sensor, and a vertical synchronization signal from the image sensor.

FIG. 9 is an explanatory diagram illustrating an example of relationships between the first period (the period of IR lighting ON) during which the IR lighting is emitted, the exposure time of image sensor 24, and vertical synchronization signal VSYNC from image sensor 24. One frame is formed by one cycle of ON and OFF of vertical synchronization signal VSYNC output from image sensor 24.

In FIG. 9, when vertical synchronization signal VSYNC corresponding to frame c1 is output from image sensor 24, the exposure of the first line of image sensor 24 is started and the exposure continues until the end point of frame c3. In addition, at the time when vertical synchronization signal VSYNC corresponding to frame c2 next to frame c1 in which the exposure of the first line of image sensor 24 is started is output from image sensor 24, the exposure of the last line of image sensor 24 is started at the time T1.

IR lighting controller 34 causes IR_LED section 36 to emit the IR lighting for a certain period (refer to the emission time in FIG. 9) after some delay time (delay) according to vertical synchronization signal VSYNC corresponding to frame c2 (time points T2 to T3). Not being limited to the certain period, IR lighting controller 34 may change the light emission period of the IR lighting by changing a duty ratio of the PWM according to the surrounding environment. As described above, after the time point T3 at which the emission of the IR lighting is ended, the exposure of the last line of image sensor 24 ends (time point T4). As above, when the exposure time (in FIG. 9, the period from frames c1 to c3) designated by the imaging parameter ends, exposure controller 33 controls such that the exposure of image sensor 24 ends.

Each frame is formed according to vertical synchronization signal VSYNC output from image sensor 24, and each section (for example, IR lighting controller 34 and RGB-IR composer 44) of monitoring camera 10 is synchronized.

In addition, the timing when the IR lighting is in an ON state, that is, the timing when the light emission condition is switched and the timing when the imaging parameter is switched may be synchronized. In this way, monitoring camera 10 can generate the RGB image and the IR image with the imaging parameter suitable for the light emission condition and can generate the composite image, and thus, it is possible to improve the image quality of the composite image.

In this way, monitoring camera 10 in the present embodiment captures the IR image using, for example, the imaging parameter of a short exposure time and a low gain suitable for capturing the IR image during the light emission period (refer to time point T2 to time point T3 in FIG. 9) in which the IR lighting is performed at a cycle of at least two frames of the frame rate of image sensor 24.

In addition, monitoring camera 10 captures the RGB image using, for example, the imaging parameter of a long exposure time and a high gain suitable for capturing the RGB image during the non-light emission period (refer to the period other than time points T2 to T3 in FIG. 9) in which the ambient light is used and the IR lighting is not emitted at a cycle of at least two frames of the frame rate of image sensor 24. The non-light emission period of the IR lighting is continuous with the light emission period. The captured IR image and the RGB image are composed and the composite image can be obtained. In the image composition, for example, the edge region of the image of the subject is detected from the IR image, and the color tone is added to the image of the subject using a color signal obtainable from the RGB image.

In this way, even in a case of using the image sensor of 24 of the rolling shutter system, monitoring camera 10 composes the IR image of the subject captured when the IR lighting is emitted and the RGB image of the subject captured when the IR lighting is not emitted. Therefore, the distortion of the output image can be decreased, and thus, it is possible to suppress the deterioration of the frame rate of the output image. In addition, even when the subject is imaged in the low-light environment, monitoring camera 10 can obtain the composite image having high color-reproducibility. In addition, the edge region can easily be acquired using the IR image, and thus, it is possible to easily acquire the bright color tone using the RGB image. Therefore, it is possible to easily improve the quality of the captured image in the low-light environment.

In addition, since monitoring camera 10 does not need a large-scale imaging system, a device cost for acquiring a color image in the low-light environment can be decreased and the adjustment and maintenance can easily be facilitated.

In addition, IR image processor 43 may set the imaging parameter for capturing the IR image such that the exposure time becomes short and the gain becomes low. RGB image processor 42 may set the imaging parameter for capturing the RGB image such that the exposure time becomes long and the gain becomes high. In this way, image capturing suitable for the IR image and the RGB image can be performed, and for example, the IR image characteristics (for example, the edge component and the gradation component) can be increased and the RGB image characteristics (for example, the color tone component) can be increased. Therefore, it is possible to easily improve the quality of the captured image in the low-light environment.

In addition, the light from the subject may be received via two-band pass filter 23. In a case of using two-band pass filter 23, turning ON and OFF the IR cut filter is not necessary compared to a case of mechanically turning ON and OFF the IR cut filter using the RGB filter and the IR cut filter. Therefore, the acquisition of the IR image and the acquisition of the RGB image can be switched at a high speed, and thus, the real-time property of the composite image can be increased, and it is possible to improve, for example, accuracy of tracking the fast moving subject.

In addition, since monitoring camera 10 uses image sensor 24 of the rolling shutter system, a CMOS sensor can be adopted as image sensor 24, and thus, it is possible to reduce the cost of monitoring camera 10.

In addition, in a case where the IR lighting is emitted in the time division basis, signal interference due to a leakage light from two-band pass filter 23 can be suppressed by monitoring camera 10 compared to a case of the IR lighting being always emitted not in the time division basis, and thus, it is possible to suppress the decrease of the accuracy of extracting the feature amount from the RGB image. Therefore, it is possible to improve the image quality of the composite image using the RGB image.

In addition, monitoring camera 10 emits the IR lighting with the imaging period for the IR image by image sensor 24 and the period other than the imaging period for the RGB image by image sensor 24 as the IR lighting emission period (light emission period). In this way, since the useless dummy image is not obtained between the IR image and the RGB image as in the case of monitoring camera 10 in the comparison example, monitoring camera 10 can obtain the output image with high quality.

In addition, monitoring camera 10 emits the IR lighting with the period from the exposure end timing of the last line of image sensor 24 in the immediately previous frame of the RGB image to the exposure start timing of the first line of image sensor 24 in the next frame of the RGB image as the light emission period of the IR lighting (refer to FIG. 9). In this way, since the IR lighting is emitted when capturing the IR image, monitoring camera 10 can reduce the influence of the ambient light, and thus, it is possible to obtain the IR image with high image quality.

In addition, monitoring camera 10 emits the IR lighting with the period from the exposure start timing of the last line of image sensor 24 in the frame of the IR image to the exposure end timing of the first line of image sensor 24 in the same the frame of the IR image as the light emission period of the IR lighting (refer to FIG. 9). In this way, since the IR lighting is emitted when capturing the IR image, monitoring camera 10 can reduce the influence of the ambient light, and thus, it is possible to obtain the IR image with high image quality.

In addition, since monitoring camera 10 designates the exposure time (that is, the IR image capturing time) under the imaging condition using the IR lighting and the exposure time (that is, RGB image capturing time) using the ambient light (the visible light) as the imaging condition for the image of the subject so as to be same such that the period becomes a cycle of at least two frames, the sensitivity of the IR image and the RGB image can be the same. Therefore, it is possible to obtain the output with the high quality.

In addition, in two-band pass filter 23 in monitoring camera 10, the transmittance of the light of which the wavelength is included in the wavelength region of the visible light or the wavelength region of the non-visible light is higher than the transmittance of the light of which the wavelength is included in other wavelength regions. In this way, monitoring camera 10 can make the IR cut filter unnecessary and a mechanical ON and OFF operation of the IR cut filter is unnecessary, and thus, it is possible to speed up the imaging operation for the IR image and the RGB image. Therefore, the delay time for generating the composite image can be reduced, and thus, it is possible to improve accuracy of tracking the fast moving subject.

In addition, monitoring camera 10 captures the IR image of the subject during the period in which the IR lighting is emitted among the period of at least two frames, and captures the RGB image during the subsequent period, and then, the IR image and the RGB image are composed in the last frame of the imaging period of the RGB image. In this way, monitoring camera 10 can adopt the CMOS sensor for image sensor 24, and thus, it is possible to reduce the cost of monitoring camera 10.

Modification Example in the Present Embodiment

Next, an example of monitoring camera 10P that not only emits the IR lighting when capturing the IR image which is the non-visible light image but also emits white LED lighting when capturing the RGB image which is the visible light image will be described as a modification example in the present embodiment with reference to the drawings.

Figure 10:
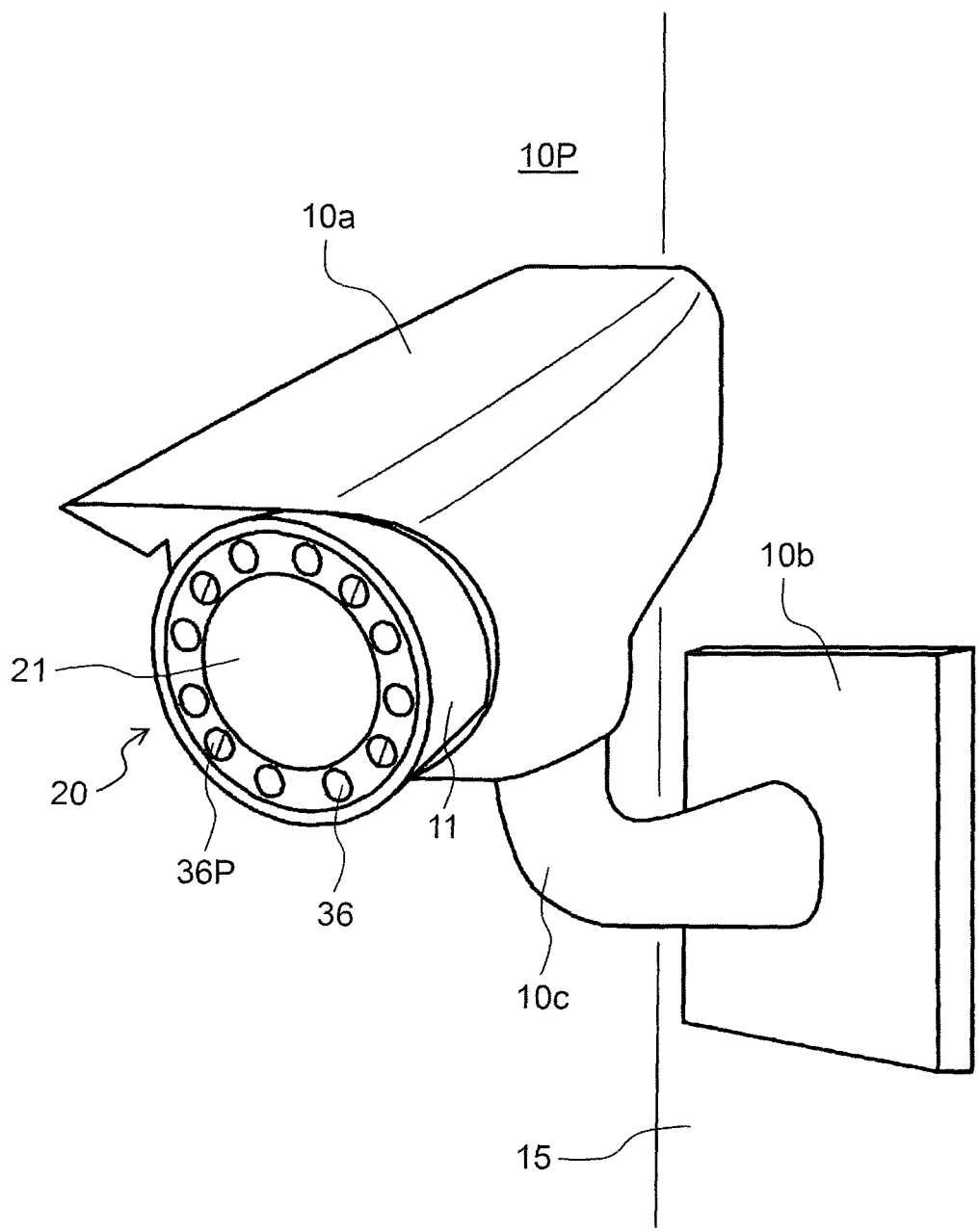
FIG. 10 is a schematic diagram illustrating an example of an external view of a monitoring camera in a modification example in the present embodiment.

FIG. 10 is a schematic diagram illustrating an example of an external view of monitoring camera 10P in the modification example in the present embodiment. In the description of monitoring camera 10P illustrated in FIG. 10, the same reference marks will be given to the same configurations of monitoring camera 10 illustrated in FIG. 1, and the description thereof may be simplified or may be omitted, and the different points will be described. In FIG. 10, in imaging section 20 of monitoring camera 10P, four white LED sections 36P are provided between IR_LED section 36 and IR_LED section 36.

Figure 11:
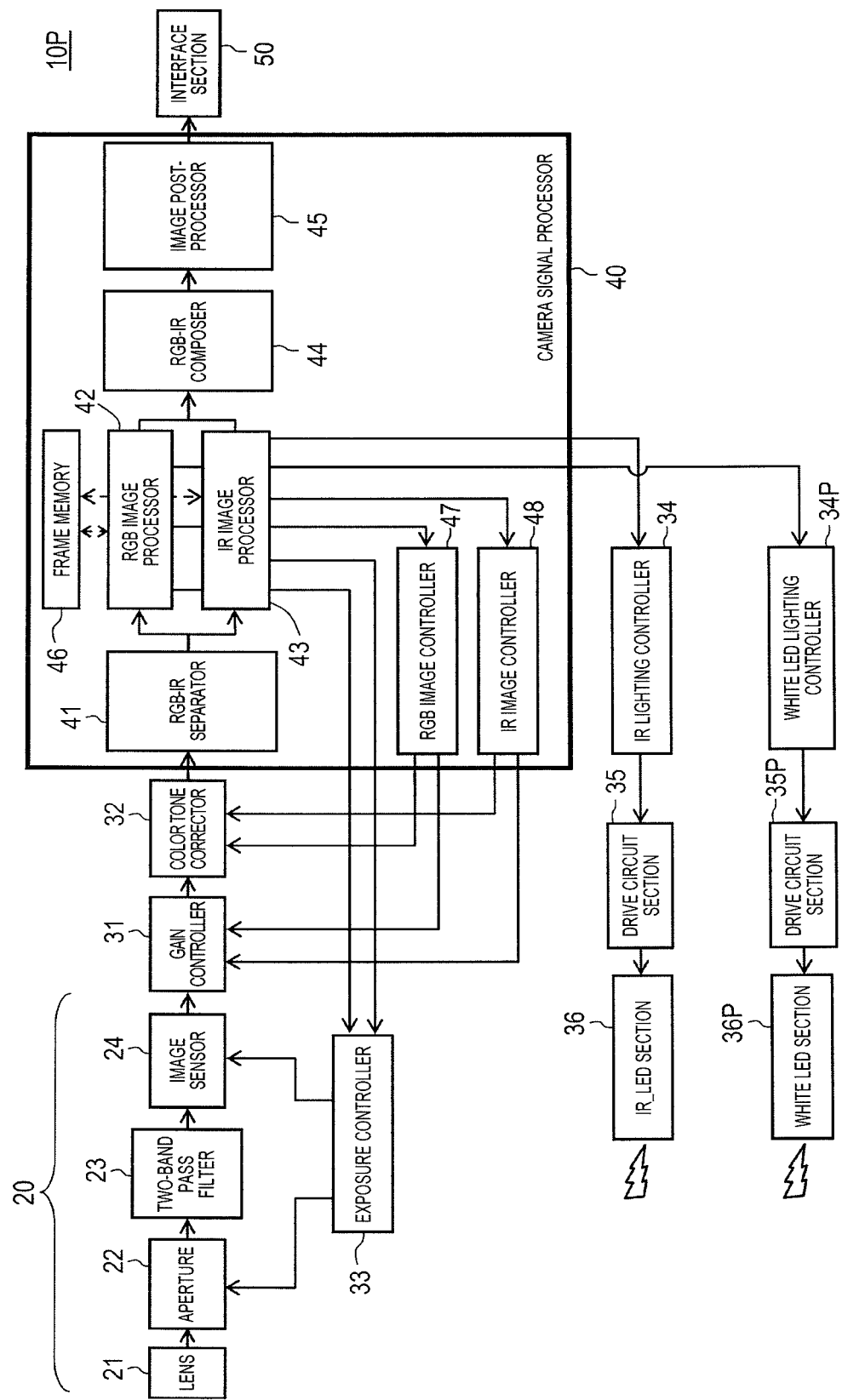
FIG. 11 is a block diagram illustrating a configuration example of the monitoring camera in the modification example in the present embodiment.

FIG. 11 is a block diagram illustrating a configuration example of monitoring camera 10P in the modification example in the present embodiment. In the description of the configuration of monitoring camera 10P illustrated in FIG. 11, the same reference marks will be given to the same configurations of monitoring camera 10 illustrated in FIG. 2, and the description thereof may be simplified or may be omitted, and the different points will be described.

Monitoring camera 10P illustrated in FIG. 11 is configured to include white LED lighting controller 34P, drive circuit section 35P and white LED section 36P in addition to the configuration of monitoring camera 10P illustrated in FIG. 2.

White LED lighting controller 34P as an example of a second light emission controller sends a control signal indicating the presence or absence of the emission from white LED section 36P to drive circuit section 35P according to, for example, the light emission condition from RGB image processor 42. White LED lighting controller 34P sends the PWM signal to drive circuit section 35P for performing the PWM control on white LED section 36P according to, for example, the light emission condition from RGB image processor 42 during the imaging period of the visible light image (the RGB image) and the imaging period of the non-visible light image (the IR image).

Drive circuit section 35P receives the control signal or the PWM signal from white LED lighting controller 34P and controls the presence or absence of the emission from white LED section 36P or the light emission amount.

White LED section 36P as an example of the second light emitter emits the white LED lighting to the subject using the light emission amount controlled by drive circuit section 35P. That is, white LED section 36P emits the white LED lighting to the subject.

Figure 12:
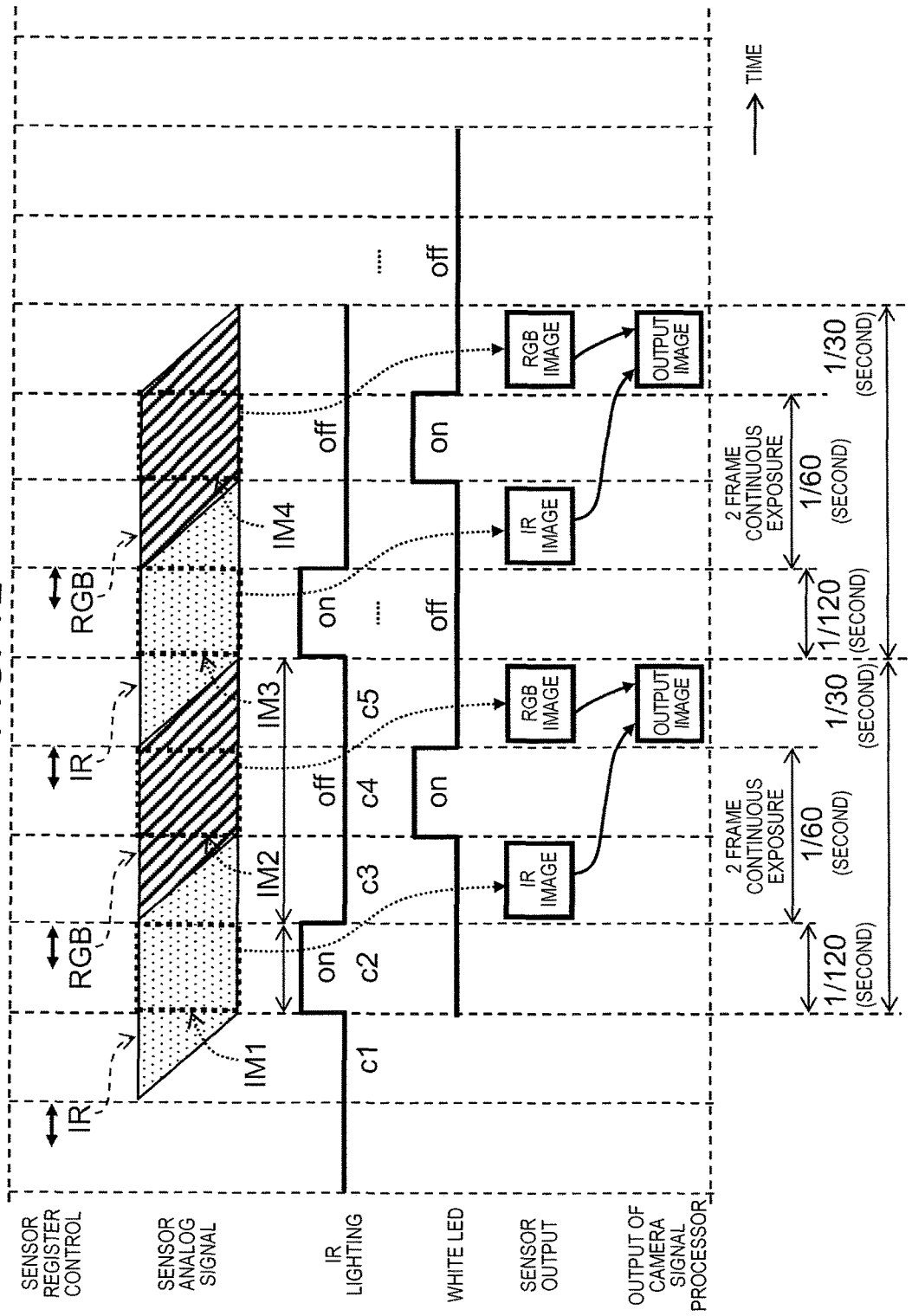
FIG. 12 is a timing chart illustrating a specific example of an imaging operation in the monitoring camera in the modification example in the present embodiment including the image sensor performing the imaging operation according to the rolling shutter system.
Figure 13:
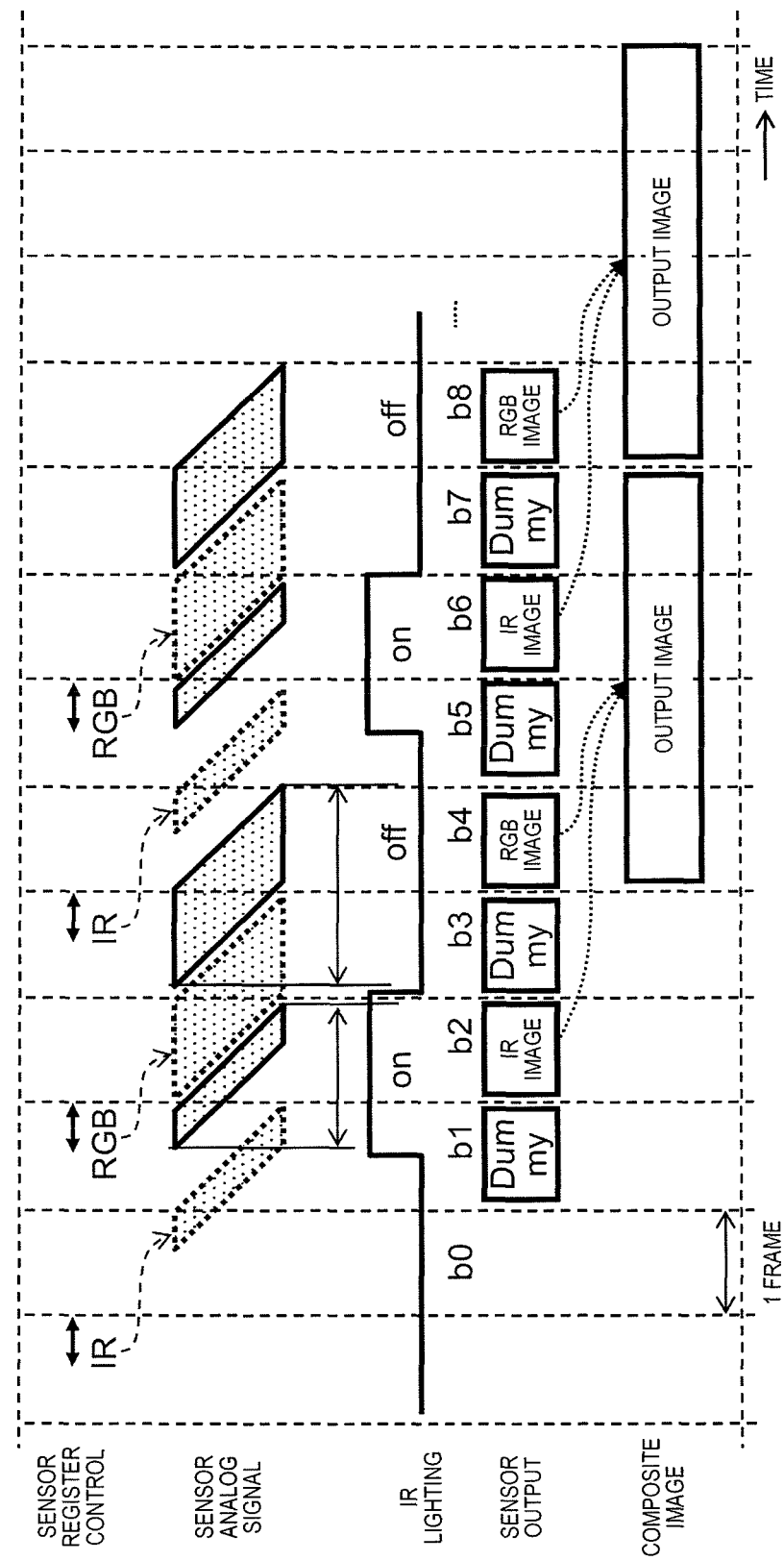
FIG. 13 is a timing chart illustrating a specific example of an imaging operation in the monitoring camera in a comparison example including the image sensor performing the imaging operation according to the rolling shutter system.

FIG. 12 is a timing chart illustrating a specific example of an imaging operation in monitoring camera 10P in the modification example in the present embodiment including image sensor 24 performing the imaging operation according to the rolling shutter system. In the description of the timing chart of the imaging operation of monitoring camera 10P illustrated in FIG. 12, the description for a content same as the timing chart of the imaging operation in monitoring camera 10 illustrated in FIG. 7 will be simplified or may be omitted, and the different content (specifically, a content relating to the emission of the white LED lighting) will be described.

In FIG. 12, in frame c4, white LED lighting controller 34P causes white LED section 36P to emit the white LED lighting over a predetermined period (refer to the description below). In frame c5, image sensor 24 acquires the RGB image captured during the period in which the white LED lighting is emitted from white LED section 36P. The exposure (imaging) period of the RGB image and the IR image in image sensor 24 is two frames similarly to the present embodiment described above (1/60 second), but may be the period longer than two frames. Since the frame rate of image sensor 24 is 120 fps, and thus, one frame is 1/120 second.

In addition, in frame c2, RGB image processor 42 sets the imaging parameter and the light emission condition suitable to the RGB image in exposure controller 33, IR lighting controller 34, white LED lighting controller 34P, and RGB image controller 47 respectively (the sensor register control). The sensor register control indicates that the imaging parameter held in the memory (register) (not illustrated) is set in each section (specifically, exposure controller 33, IR lighting controller 34, white LED lighting controller 34P, and RGB image controller 47).

In frame c3, the imaging (exposure) in the first line of the image sensor elements in image sensor 24 is started, and the capturing of the RGB image is performed until frame c5 in the image sensor. Image sensor 24 acquires IR image IM1 captured in frame c2 in which the IR light is emitted.

On the other hand, in frames c3 to c5, IR lighting controller 34 does not cause IR_LED section 36 to emit the IR light, but white LED lighting controller 34P causes white LED section 36P to emit the white LED lighting in frame c4 which is the exposure (imaging) period of the RGB image. In frame c5, image sensor 24 acquires RGB image IM2 captured in frame c4 during which the white LED lighting is emitted. The exposure (imaging) period for capturing the RGB image in image sensor 24 is two frames (1/60 second).

In addition, in frame c5, RGB-IR composer 44 composes the IR image acquired in frame c3 (that is, IR image IM1 captured in frame c2) and the RGB image acquired in frame c5 (that is, RGB image IM2 captured in frame c4) and generates the composite image (the output image) to output to image post-processor 45. Subsequent to frame c5, the operations similar to those in frames c0 to c5 are repeated, and then, IR image IM3 captured in the frame during which the IR light is emitted and RGB image IM4 captured in the frame during which the white LED lighting is emitted are composed.

As described above, monitoring camera 10P of the modification example in the present embodiment emits the white LED lighting to the subject according to the light emission condition of the white LED lighting which is the white light during the imaging period for the RGB image by image sensor 24 and the period other than the imaging period for the IR image by image sensor 24, and then, generates the output image by composing IR image IM1 captured during the period in which the IR light is emitted and RGB image IM2 captured during the period in which the white LED lighting is emitted.

In this way, monitoring camera 10P can obtain an effect similar to that in monitoring camera 10 in the present embodiment described above, and furthermore, it is possible to make the start line and end line corresponding to the imaging period of image sensor 24 be the same using IR image IM1 captured during the period in which the IR light is emitted and RGB image IM2 captured during the period in which the white LED lighting is emitted. Therefore, the images of the same exposure period (in other words, the imaging period) can be obtained respectively, and thus, it is possible to further decrease the distortion occurring in the output image of the fast moving object (subject).

In addition, monitoring camera 10P causes the white LED lighting to be emitted with the period from the exposure end timing of the last line of image sensor 24 in the frame of the immediately previous IR image to the exposure start timing of the first line of image sensor 24 in the next frame of the IR image as the light emission period for the white LED lighting (refer to FIG. 12). In this way, the white LED lighting is emitted during capturing the RGB image and the influence by the ambient light can be reduced, and thus, monitoring camera 10P can obtain the vivid RGB image with high image quality.

In addition, monitoring camera 10P causes the white LED lighting to be emitted with the period from the exposure start timing of the last line of image sensor 24 in the frame of the RGB image to the exposure end timing of the first line of image sensor 24 in the same frame of the RGB image as the light emission period of the LED lighting (refer to FIG. 12). In this way, the white LED lighting is emitted during capturing the RGB image and the influence by the ambient light can be reduced, and thus, monitoring camera 10P can obtain the vivid RGB image with high image quality.

As described above, various embodiments are described with reference to the drawings. However, it is needless to say that the present invention is not limited to the described examples. It is apparent that those skilled in the art can conceive various change examples or the modification examples within the scope of the claims attached hereto, and it can be understood that those may naturally belong to the technical scope of the present invention.

In addition, in the present embodiment, monitoring camera 10 is described as an example of an imaging device.

However, another imaging device (for example, a car-mounted camera, an industrial camera, a medical camera, or a consumer camera) also can be used in the description.

INDUSTRIAL APPLICABILITY

The present invention is useful for an imaging device and an imaging method for decreasing the distortion of an output image and suppressing the deterioration of a frame rate of the output image even in a case of using the image sensor of the rolling shutter system.

REFERENCE MARKS IN THE DRAWINGS 10, 10P monitoring camera
10a housing
10b mounter
10c arm section
11 lens barrel
15 wall surface
20 imaging section
21 lens
22 aperture
23 two-band pass filter
24 image sensor
25, 56 color filter
25a, 25b, 25c, 25d, 56a, 56b, 56c, 56d filter section
31 gain controller
32 color tone corrector
33 exposure controller
34 IR lighting controller
34P white LED lighting controller
35, 35P drive circuit section
36 IR_LED section
36P white LED section
40 camera signal processor
41 RGB-IR separator
42 RGB image processor
43 IR image processor
44 RGB-IR composer
45 image post-processor
46 frame memory
47 RGB image controller
48 IR image controller
50 interface section

The invention claimed is:

1. An imaging device comprising:
an imaging sensor of a rolling shutter system, that captures a non-visible light image and a visible light image;
a first light emitter that emits non-visible light as first auxiliary light; and
a processor that composes the non-visible light image and the visible light image,
wherein,
the imaging sensor captures the non-visible light image during a first period that includes an emission period of the first auxiliary light and is longer than the emission period of the first auxiliary light,
the imaging sensor captures the visible light image during a second period that is subsequent to the emission period of the first auxiliary light and is a period that the first auxiliary light is not emitted, and
the processor composes the non-visible light image captured during the first period and the visible light image captured during the second period.

2. The imaging device of claim 1, wherein
the processor further causes the first light emitter to emit the first auxiliary light in the emission period, the emission period being a period in which the non-visible light image is being captured and the visible light image is not being captured.

3. The imaging device of claim 2,
wherein the imaging sensor is provided with a plurality of lines, each line of the plurality of lines including a plurality of imaging sensor elements arrayed in line, and
wherein the emission period is a period from an exposure end time for a last line of the plurality of lines in the imaging sensor in a frame of the visible light image to an exposure start time for a first line of the plurality of lines in the imaging sensor in a next frame of the visible light image.

4. The imaging device of claim 2,
wherein the imaging sensor is provided with a plurality of lines, each line of the plurality of lines including a plurality of imaging sensor elements arrayed in line, and
wherein the emission period is a period from an exposure start time for the last line of the plurality of lines in the imaging sensor in a frame of the non-visible light image to an exposure end time for the first line of the plurality of lines in the imaging sensor in the frame of the non-visible light image.

5. The imaging device of claim 1, further comprising:
a filter,
wherein the imaging sensor receives light via the filter,
wherein transmittance of the filter for light of a wavelength in a first wavelength region or a second wavelength region is higher than transmittance for light of a wavelength in a wavelength region other than the first wavelength region and the second wavelength region,
wherein the first wavelength region includes a wavelength region of the visible light, and
wherein the second wavelength region includes a wavelength region of the non-visible light.

6. The imaging device of claim 1, further comprising:
a second light emitter that emits white light as second auxiliary light; and
wherein the processor further causes the second light emitter to emit the second auxiliary light in a third period, which is included in the second period, the third period being a period in which the visible light image is being captured by the imaging sensor, and the non-visible light image is not being captured by the imaging sensor,
wherein the processor composes the non-visible light image captured during the first period and the visible light image captured during the second period, which includes the third period, in which the second auxiliary light is emitted.

7. The imaging device of claim 6,
wherein the imaging sensor is provided with a plurality of lines, each line of the plurality of lines including a plurality of imaging sensor elements arrayed in line, and
wherein the third period is a period from an exposure end time for a last line of the plurality of lines in the imaging sensor in a frame of the non-visible light image to an exposure start time for a first line of the plurality of lines in the imaging sensor in a next frame of the non-visible light image.

8. The imaging device of claim 6,
wherein the imaging sensor is provided with a plurality of lines, each line of the plurality of lines including a plurality of imaging sensor elements arrayed in line, and
wherein the third period is a period from an exposure start time for a last line of the plurality of lines in the imaging sensor in a frame of the visible light image to an exposure end time for a first line of the plurality of lines in the imaging sensor in the frame of the visible light image as the second period.

9. The imaging device of claim 1,
wherein a length of the second period is equal to or longer than a length of the first period.

10. An imaging method in an imaging device including an imaging sensor of a rolling shutter system, the method comprising:
capturing a non-visible light image and a visible light image by the imaging sensor of the rolling shutter system;
emitting non-visible light as first auxiliary light; and
composing the non-visible light image and the visible light image,
wherein,
the capturing of the non-visible light image is performed during a first period that includes an emission period of the first auxiliary light and is longer than the emission period of the first auxiliary light,
the capturing of the non-visible light image is performed during a second period that is subsequent to the emission period of the first auxiliary light and is a period that the first auxiliary light is not emitted, and
the composing of the non-visible light image and the visible light image composes the non-visible light image captured during the first period and the visible light image captured during the second period.

* * * * *